(12) United States Patent
Stauch et al.

(10) Patent No.: US 8,317,443 B2
(45) Date of Patent: Nov. 27, 2012

(54) SHEAR SCREW

(75) Inventors: Ing Gart Stauch, Hof (DE); Volker Markgraf, Roslau (DE); Rainer Bachmann, Rodeegrun (DE); Peter Grötsch, Rehau (DE)

(73) Assignee: Nexans, Paris (FR)

( * ) Notice: Subject to any disclaimer, the term of this patent is extended or adjusted under 35 U.S.C. 154(b) by 0 days.

(21) Appl. No.: 12/313,152

(22) Filed: Nov. 17, 2008

(65) Prior Publication Data

US 2009/0196708 A1   Aug. 6, 2009

(30) Foreign Application Priority Data

Dec. 11, 2007   (EP) .................................. 07291494

(51) Int. Cl.
*F16B 31/00* (2006.01)
(52) U.S. Cl. ................. 411/5; 411/2; 411/393; 411/403
(58) Field of Classification Search ............ 411/1–3, 411/5, 8, 360, 366.2, 393, 394, 402, 403
See application file for complete search history.

(56) References Cited

U.S. PATENT DOCUMENTS

| | | | | |
|---|---|---|---|---|
| 3,963,322 A | * | 6/1976 | Gryctko | 439/814 |
| 5,681,135 A | * | 10/1997 | Simonson | 411/5 |
| 6,042,430 A | * | 3/2000 | Hollick | 439/797 |
| 6,056,753 A | * | 5/2000 | Jackson | 606/308 |
| 6,176,659 B1 | * | 1/2001 | Hardt et al. | 411/5 |
| 6,321,624 B1 | | 11/2001 | Croton et al. | 81/124.7 |
| 6,478,795 B1 | * | 11/2002 | Gournay et al. | 606/246 |
| 7,214,108 B2 | * | 5/2007 | Barnett | 439/797 |

* cited by examiner

*Primary Examiner* — Gary Estremsky
(74) *Attorney, Agent, or Firm* — Sofer & Haroun, LLP

(57) ABSTRACT

A shear screw has predetermined breaking points in two planes, separated axially from one another, and it has centrally a blind hole extending over a substantial length and having a cross section which is suitable for transmitting a torque to the shear screw by means of a pin-like tool of adapted dimensions which can be inserted into the blind hole. The blind hole extends to about level with the predetermined breaking point which is arranged in the lower region, facing the end face of the shear screw, of the latter and has a strength greater than that of the other predetermined breaking point.

6 Claims, 3 Drawing Sheets

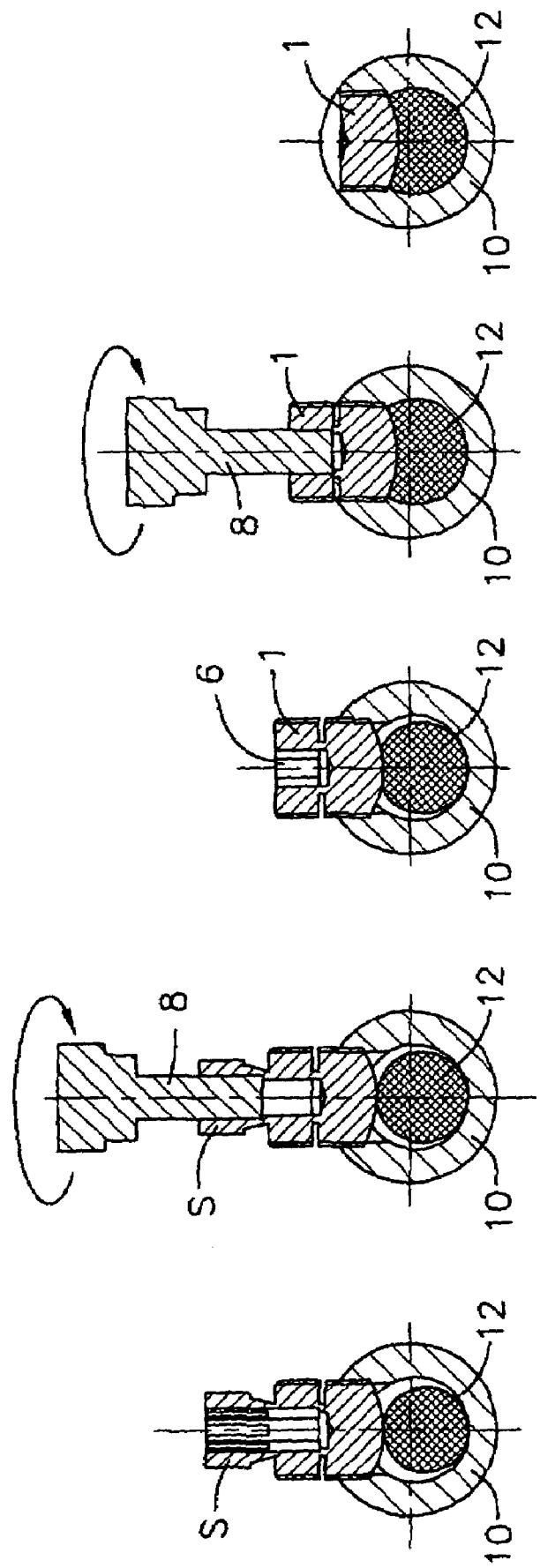

SHEAR SCREW

RELATED APPLICATION

This application claims the benefit of priority from European Patent Application No. 07 291 494.8, filed on Dec. 11, 2007, the entirety of which are incorporated by reference.

FIELD OF THE INVENTION

The invention relates to a shear screw for fastening an electrical conductor in a metallic terminal designed as a tubular piece, which shear screw has in its wall at least one through-hole, provided with a thread, for receiving the shear screw which in two planes separated axially from one another has predetermined breaking points, a first predetermined breaking point and a second predetermined breaking point, and which has centrally a blind hole extending over a substantial length and having a cross section which is suitable for transmitting a torque to the shear screw by means of a pin-like tool which can be inserted into the blind hole and the cross section of which corresponds to the cross section of the blind hole and the external dimensions of which correspond to the clear dimensions of the latter (EP 0 750 723 B1).

BACKGROUND

A cross-sectional shape, suitable for the transmission of a torque, of blind hole and tool is to be understood, in particular, as meaning a polygonal cross section, advantageously a hexagon. Likewise suitable cross-sectional shapes are stars, which may also have rounded tips and corners, or else simple slots and cross slots made in the shear screw, with the corresponding tool shaped as flat profiles and cross. The polygonal cross section is considered below as representing all possible cross-sectional shapes.

A shear screw of this type, referred to briefly below as a "screw", is used, for example, in electrical power engineering for connecting the conductors of two power cables. To achieve and maintain electrically highly conductive contact, a firm connection is required between the conductors of the two cables and a tubular metallic terminal into which the conductors are inserted. This can be ensured, using what is known as a torque wrench, which, when the screw is tightened, then "spins" when a sufficiently firm fit of the latter is achieved. However, such a torque wrench is often not available on a building site. The screw is therefore, as a rule, screwed tight by means of another tool, for example by means of a simple spanner. In order to ensure, and also make it possible to check, that the screw is tightened sufficiently firmly, the upper part of the screw is then sheared off when the strength of its predetermined breaking point is reached or overshot. The then missing screw head is an indication that the screw is tightened sufficiently firmly. After the screw head has been sheared off, the screw does not project or projects only insignificantly out of the terminal. An insulating element to be mounted above the latter is therefore neither damaged mechanically nor impaired in terms of its insulating properties.

The known screw according to EP 0 750 723 B1, mentioned in the introduction, has a plurality of predetermined breaking points spaced axially apart. It is sheared off at one of the predetermined breaking points as a function of its depth of penetration into a cable plug designed as a metallic tubular piece, its depth of penetration depending on the dimensions of a conductor to be secured. A tool pin initially inserted completely into a blind hole of the screw is, for this purpose, gradually moved out of the screw in relation to the latter as a result of a screwing operation by means of an outer bell-like supporting means which is part of the tool and which bears against the cable plug. The screw is sheared off at a predetermined breaking point which lies approximately level with the end face of the tool pin, in the position in which the screwing operation is terminated. The tool is, overall, complicated.

OBJECTS AND SUMMARY

The subject on which the invention is based is to configure the screw outlined in the introduction, such that it can be brought to bear firmly against a conductor in a simpler way.

This object is achieved, according to the invention, in that the blind hole extends to about level with the second predetermined breaking point which is arranged in the lower region, facing the end face of the screw, of the latter and which has a greater strength than the first predetermined breaking point, in that the screw has formed in it, concentrically to the blind hole, a recess axially shorter than the latter and having a cross section identical to the cross section of the blind hole, which recess has the same clear width as the blind hole and is displaced with respect to the latter in the circumferential direction at an angle lying preferably between 10° and 40°, and extends to about level with the first predetermined breaking point which is arranged in the upper region, facing the head of the screw, of the latter, and in that the orifice of the blind hole at the head of the screw is deformed in such a way that the tool can be inserted only into the shorter recess.

This screw is configured such that it can be rotated in the threaded bore of a terminal by means of a simple pin-like tool, until a conductor to be fastened is secured with sufficient pressure in the said terminal.

Its two predetermined breaking points have different strength, so that the screw is sheared off first or only in a first working position at the first predetermined breaking point having the lower strength. In this first working position, for example, a thinner conductor of a cable is secured in the terminal. After the head of the screw has been sheared off at the first predetermined breaking point, the latter may, if appropriate, be brought by means of the same simple tool as before into a second working position which is provided, for example, for securing a thicker conductor and in which the screw is sheared off at the second predetermined breaking point. This simple operation is made possible, on the one hand, by the blind hole and, on the other hand, by the recess which is rotated with respect to the latter. In this case, the deformation of the blind hole in the region of the head of the screw ensures that the screw is sheared off first at the first predetermined breaking point, because the tool can be inserted only into the recess which reaches only to level with the first predetermined breaking point. Thereafter, the blind hole is accessible to the tool, and therefore the screw can be rotated further with increased force to secure a thicker conductor in the terminal, until the screw is sheared off also at the second predetermined breaking point.

BRIEF DESCRIPTION OF THE DRAWINGS

Exemplary embodiments of the subject of the invention are illustrated in the drawings in which:

FIGS. 5 to 13 show different positions of the screw in a terminal.

DETAILED DESCRIPTION

Figure 3:
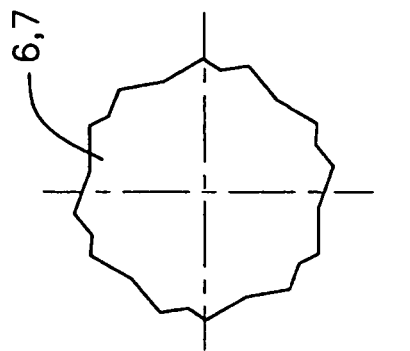
FIG. 3 shows a detail from FIG. 2 in an enlarged illustration.

The shear screw S illustrated in longitudinal section in FIG. 1, and designated below, further, as "screw S", has a threaded part 1 and a head 2 which, in the exemplary embodiment illustrated, has smaller radial dimensions than the threaded part 1 and which is designed without an external thread. The threaded part 1 ends on the end face 3 of the screw S. The transition from the head 2 to the threaded part 1 is conically tapered continuously. The point having the smallest diameter forms a first predetermined breaking point 4 of the screw S. Moreover, in the threaded part 1, a peripheral gap-like depression is made, which forms a second predetermined breaking point 5 of the screw S. The strength of the second predetermined breaking point 5 is greater than that of the first predetermined breaking point. In the embodiment of the screw S according to FIG. 1, the two predetermined breaking points 4 and 5 run at right angles to the axis of the screw S and parallel to one another.

Figure 2:
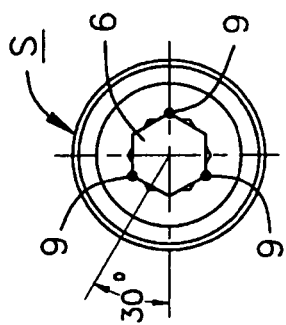
FIG. 2 shows a top view of the head of a screw according to FIG. 1.

Formed centrically in the screw S is a blind hole 6 with a polygonal cross section which extends from the end face of the head 2 to level with the second predetermined breaking point 5. The blind hole 6 has a preferably hexagonal cross section, as shown in FIGS. 2 and 3. It may, however, also have a different polygonal cross section. Formed in the screw S concentrically to the blind hole 6 is a recess 7, likewise of polygonal cross section, which is axially shorter than the blind hole 6 and reaches to level with the first predetermined breaking point 4. The recess 7 has the same cross section and the same clear dimensions as the blind hole 6. It is therefore likewise advantageously of hexagonal design. The recess 7 is offset in the circumferential direction with respect to the blind hole 6, for example by an angle of 30°, as depicted in FIG. 2. This angle should preferably lie between 10° and 40°, specifically, advantageously, at 20°.

Figure 6:
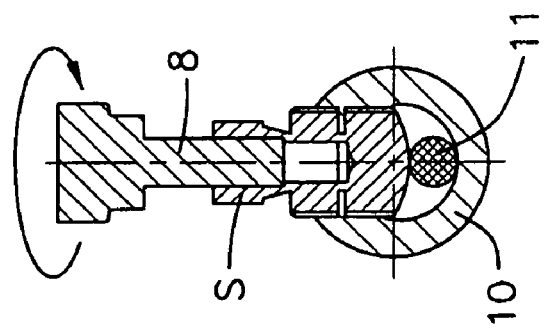
Figure 5:
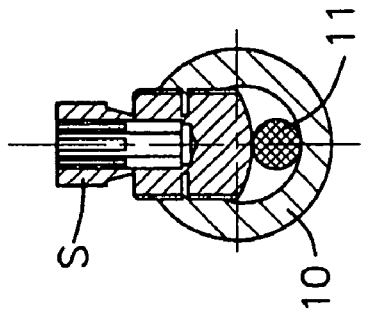

The blind hole 6 is deformed at its entrance into the screw S, that is to say on the end face of the head 2, such that a pin-like tool 8 depicted, for example, in FIG. 6 cannot be inserted into the said blind hole. The tool 8 serves for rotating the screw S. It has a polygonal cross section which corresponds to the cross section of blind hole 6 and recess 7. Its external dimensions correspond to the clear dimensions of blind hole 6 and recess 7. According to FIG. 2, the blind hole 6 has as deformation, for example at three points 9, small projections which project into its profile and serve as stoppers for the tool 8. Such a stopper basically is sufficient at only one point 9. The recess 7 has an unchanged cross section in the end face at the head 2 of the screw, so that the tool 8 can be inserted, unimpeded, into the latter.

The handling of the screw S according to the invention is explained below, by way of example, with reference to FIGS. 5 to 13:

An electrical conductor 11 having relatively small dimensions is to be secured with a predetermined pressure in a terminal 10 designed as a metallic tubular piece. For this purpose, the screw S is screwed into a threaded bore of the terminal 10 until, according to FIG. 5, it bears against the conductor 11 previously inserted into the latter. This may, however, also be carried out by hand, using the tool 8.

Figure 7:
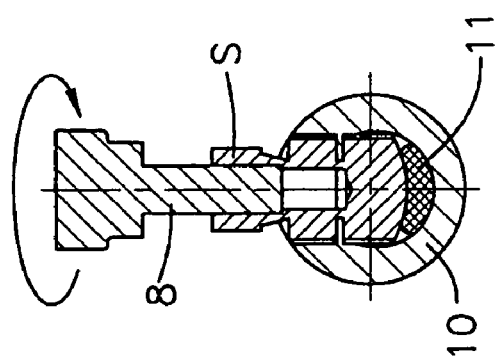

The tool 8 is inserted, in the position according to FIG. 6, into the recess 7. Its end face then lies level with the first predetermined breaking point 4. By the tool 8 being rotated about the axis of the screw S, the latter is screwed further into the terminal 10, with the result that the conductor 10 is compressed. In the position of the screw S, as illustrated in FIG. 7, the conductor 10 is loaded with sufficient pressure. When the tool 8 is further rotated, the head 2 of the screw S is sheared off. According to FIG. 8, the threaded part 1 remains in the terminal 10, without any projecting excess.

The same process also applies initially to securing a thicker conductor 12 in the terminal 10. According to FIG. 9, the screw S is first screwed into the terminal 10 again until it comes to bear against the conductor 12, and is then further rotated by means of the tool 8 (FIG. 10), with the result that the conductor 12 is deformed. The counterforce of the conductor 12 then becomes so high that the head 2 of the screw S is sheared off at the weaker first predetermined breaking point 4, before a sufficiently high pressure is exerted on the conductor 12. This position of the remaining threaded part 1 of the screw S is illustrated in FIG. 11.

The tool 8 is then inserted into that part of the blind hole 6 which is present in the threaded part 1. The threaded part 1 of the screw S is then further rotated until the pressure to be exerted on the conductor 12 is reached (FIG. 12). The upper part of the threaded part 1 of the screw S is then sheared off at the second predetermined breaking point 5. According to FIG. 13, the lower part of the threaded part 1 remains in the terminal 10, again without any projecting excess.

To connect the conductors of two power cables, in the customary technique the stripped conductor of a second cable is secured to the other end of the terminal 10 in a similar way by means of a screw S. Finally, an insulating element can be formed around the terminal 10.

Figure 4:
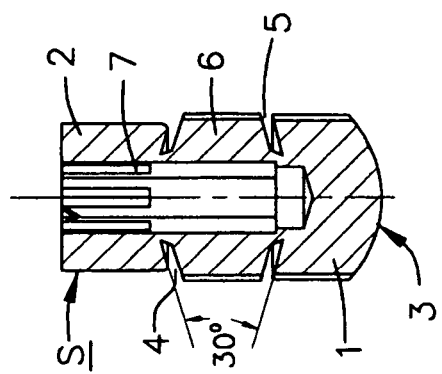
FIG. 4 shows a longitudinal section through an embodiment of the screw, modified with respect to FIG. 1.
Figure 1:
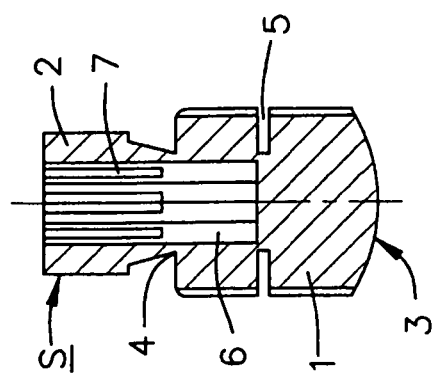
FIG. 1 shows a longitudinal section through a screw according to the invention.
Figure 8:
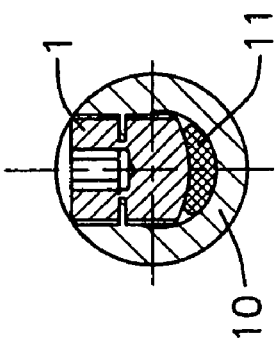

The predetermined breaking points 4 and 5 of the screw S, according to the embodiment of the latter shown in FIG. 1, run at right angles to the axis of the screw S and parallel to one another. According to FIG. 4, they may also run obliquely to the axis of the screw S, specifically preferably with opposite direction of the slopes. The directions of these then form an acute angle of, for example, 30° with one another. In this embodiment of the screw S, the predetermined breaking point 5 ends nearer to the end face 3 of the latter, so that the blind hole 6 can be lengthened, as compared with the embodiment according to FIG. 1. The tool 8 can thereby be inserted more deeply into the screw S, and a correspondingly higher torque can be transmitted to the predetermined breaking point 5.

The invention claimed is:

1. Shear screw for fastening an electrical conductor in a metallic terminal shaped as a tubular piece, with at least one through-hole in its wall provided with a thread, for receiving said shear screw, said shear screw comprising:
   a head;
   a threaded part;
   a first predetermined breaking point;
   a second predetermined breaking point, wherein said first and second predetermined breaking points are separated axially from one another with said second predetermined breaking point having a greater strength than said first predetermined breaking point; and
   a centrally arranged blind hole extending over a substantial length through said shear screw having a cross section for accepting a pin like tool having a corresponding cross section for transmitting a torque to said shear screw wherein said blind hole extends to about level with said second predetermined breaking point which is arranged in a lower end face region, of said threaded part of said shear screw, and wherein said shear screw has formed in it, concentrically to said blind hole, a recess, axially shorter than said blind hole and having a cross section identical to the cross section of said blind hole, and is displaced with respect to said blind hole in the circumferential direction at an angle lying preferably between 10° and 40°, and which recess extends to about level with said first predetermined breaking point which is arranged in an upper region between said head and said threaded part of said shear screw, and wherein an orifice of said blind hole and said recess at said head of said shear screw is dimensioned in such a way that said pin-like tool can be inserted only into said recess and not into said full depth of said blind hole.

2. Shear screw according to claim 1, wherein the blind hole, recess and tool have a polygonal cross section.

3. Shear screw according to claim 2, wherein the cross section of blind hole, recess and tool is a hexagon.

4. Shear screw according to claim 1, wherein the predetermined breaking points run at right angles to the axis of the shear screw and parallel to one another.

5. Shear screw according to claim 1, wherein the predetermined breaking points run obliquely to the axis of the shear screw.

6. Shear screw according to claim 5, wherein the predetermined breaking points run towards one another in opposite directions so as to form an acute angle.

* * * * *